United States Patent Office 3,291,508
Patented Dec. 13, 1966

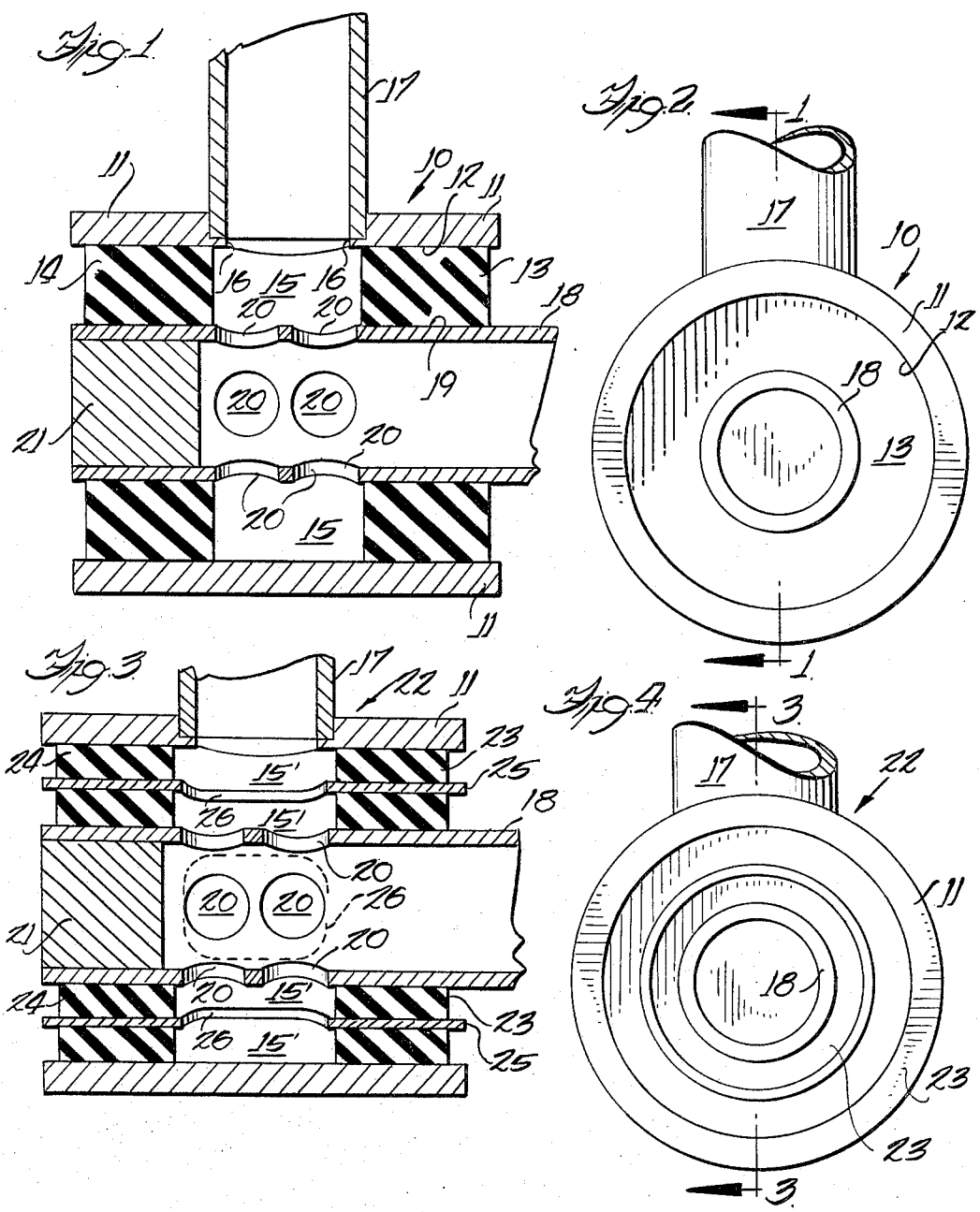

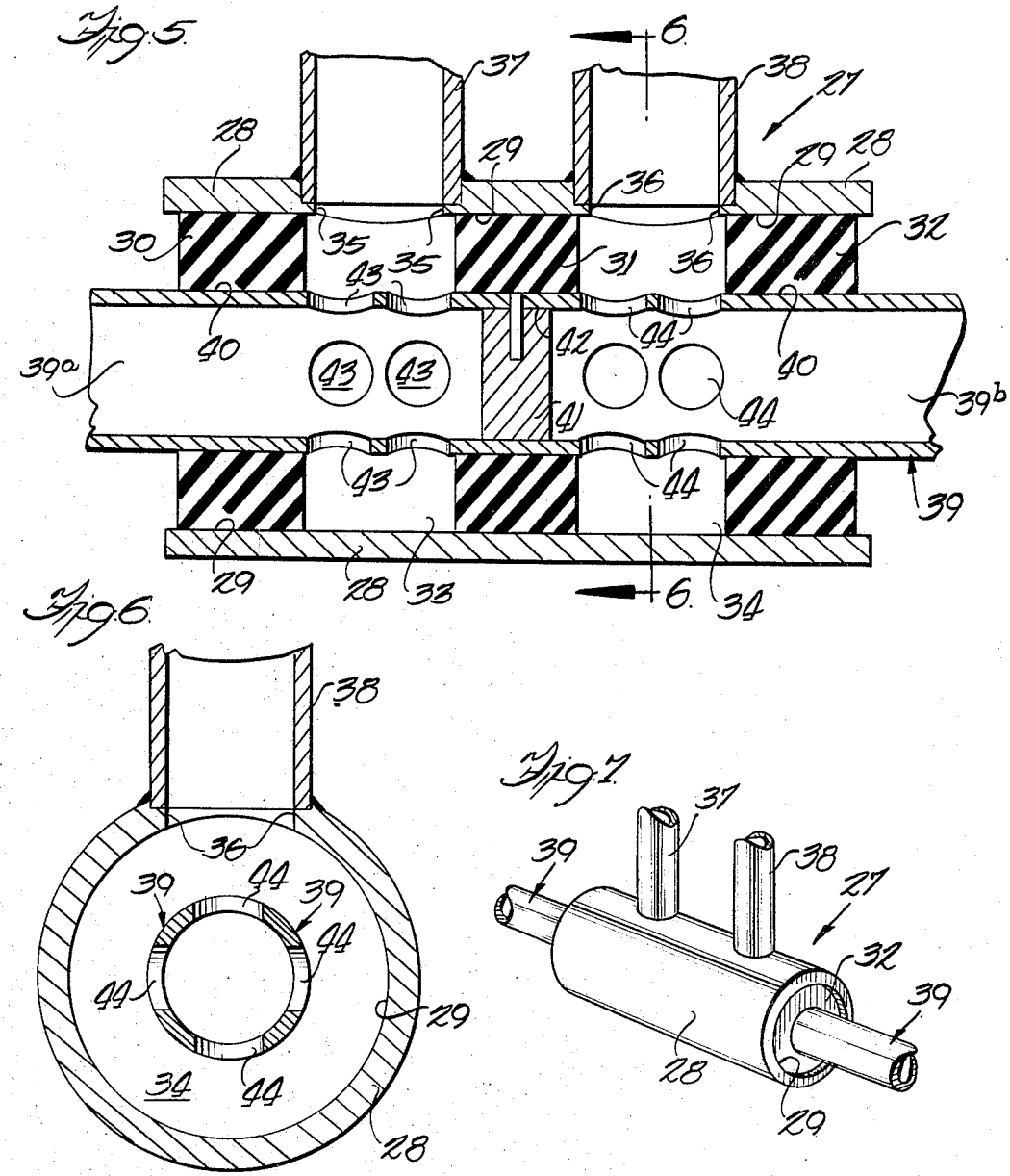

3,291,508
FLEXIBLE FLUID JOINT
C. Paul Kolthoff, Jr., Naperville, Ill., assignor to International Harvester Company, Chicago, Ill., a corporation of Delaware
Filed Dec. 21, 1964, Ser. No. 419,820
6 Claims. (Cl. 285—132)

This invention relates to flexible fluid joints. More in particular this invention relates to a flexible fluid joint for sealingly connecting in high pressure fluid flow relation a first rigid conduit with a second rigid conduit wherein limited movement of one of the conduits with respect to the other of the conduits is permitted.

In vehicles having fluid powered accessories such as bulldozers and bucket loaders, the hydraulic pump, controls and the hydraulic accessory are commonly interconnected in operative relation by flexible rubber hoses. This is done to accommodate the distortions of the vehicle when under loads, to accommodate manufacturing tolerances, and to permit the relative movements necessary for operation of the accessory.

Modern vehicle performance demands require a rapid response from all vehicle components and accessories. This has resulted in demands for increasingly large flow quantities for the hydraulic equipment and higher operating system fluid pressures, up to 5000 p.s.i. High working pressure hose now available is either too small in diameter, or too bulky, stiff, and costly for most modern day vehicle applications. To circumvent this problem, the present invention has for its prime objective the provision of a resilient or flexible joint for permitting the flow of fluid at high pressure from a first inflexible conduit to a second inflexible conduit.

Another important object of the invention is to provide a resilient fluid joint according to the preceding object wherein the joint is capable of mechanically carrying a load in addition to its fluid pressure load.

Still another object of the invention is to provide a resilient fluid joint according to the preceding objects wherein tubular shaped reinforcement insert elements are employed to permit a further increase in fluid pressure without a corresponding increase in physical size of the joint.

A yet further object of the invention is to provide a flexible fluid joint according to the preceding objects which is simple in design and of low cost.

These and other important objects inherent and encompassed by the invention will be more readily understood from the ensuing description of preferred embodiments, the appended claims and the annexed drawings wherein:

FIGURE 1 is a side elevation in section, taken on line 1—1 of FIGURE 2, partly broken away, showing construction details of the flexible fluid joint of the present invention for communicating fluid flow from one rigid pipe resiliently connected to another rigid pipe.

FIGURE 2 is an end elevational view, partly broken away, of the flexible fluid joint of FIGURE 1;

FIGURE 3 is a side elevation in section, taken on line 3—3 of FIGURE 4 showing a flexible joint similar to that shown in FIGURE 1 except that a tubular shaped reinforcement insert element is included.

FIGURE 4 is an end elevational view, partly broken away, of the flexible joint shown in FIGURE 3;

FIGURE 5 is a side elevation in section, partly broken away showing a joint similar to that shown in FIGURE 1 except that it is a double joint wherein two independent flow passages are provided, wherein two rigid parallel pipes are connected to two co-axial, rigid pipes;

FIGURE 6 is a transverse section taken on line 6—6 of FIGURE 5 showing additional details of construction; and FIGURE 7 is a perspective view of the flexible joint shown in FIGURES 5 and 6.

Referring to the drawing in FIGURE 1 the numeral 10 indicates generally one embodiment of a flexible fluid joint of this invention. The flexible joint 10 may include a generally tubular shaped hollow casing 11 constructed of rigid material such as steel. Secured in bonded relation to the inner peripheral wall 12 of the casing 11 is a pair of resilient annular members or bushings 13 and 14. From FIGURE 1 it will be seen that the bushing 13 is positioned in axial spaced relation with respect to the bushing 14 forming a chamber 15. It is of a primary importance that the bushings 13 and 14 be constructed of a flexible material such as, for example, natural or synthetic rubber of a type resistant to the fluid being conducted by the joint 10.

Disposed in the casing 11 is a transverse aperture 16 into which is fitted a transverse rigid conduit 17. The conduit 17 is rigidly connected to the casing 11 by any conventional means such as by welding or brazing. From FIGURE 1 it will be apparent that the conduit 17 is in fluid communication with the chamber 15.

Positioned concentrically or in end-wise relation with respect to the bushings 13 and 14 as well as the housing 11 is a longitudinal conduit 18 as seen in FIGURES 1 and 2. The outer peripheral surface 19 of the longitudinal conduit 18 is secured in bonded relation to the bushings 13 and 14 as indicated. Owing to the resiliency of the rubber-like bushings 13 and 14 it will be apparent that the conduit 18 may be moved a limited amount relative to the conduit 17, both axially and rotationally.

The longitudinal conduit 18 may be provided with a plurality of transverse openings 20 adjacent the chamber 15 thereby communicatively connecting the conduit 18 with the chamber 15. Since it was previously stated that the conduit 17 is communicatively connected to the chamber 15 it is apparent that in FIGURE 1 the conduit 18 is in fluid communication with the conduit 17.

Referring again to FIGURE 1 the longitudinal conduit 18 may be provided with a plug 21 to prevent fluid flow therethrough. The plug 21 may be sealingly engaged to the conduit 18 by any conventional means such as welding or brazing.

It should be observed that fluid pressure in cavity 15 will act against the flexible bushings 13 and 14. This action will produce a shearing stress at the bonded interfaces between bushings 13 and 14, and the casing 11 and conduit 18. It is necessary that the conduit 18 be continuous between bushings 13 and 14 to resist the separating forces applied by the hydraulic pressures.

Referring now to FIGURES 3 and 4 it will be seen that the flexible fluid joint indicated at 22 is identical to the fluid joint shown in FIGURES 1 and 2 except that the bushings 23 and 24 are strengthened by insertion of a tubular shaped reinforcement element 25. The tubular reinforcement element 25 is bonded to the bushings 23 and 24 and is provided with transverse ports or openings 26 so that fluid communication is provided from the transverse conduit 17 through the chamber 15' to the longitudinal conduit 18.

The purpose of the tubular shaped reinforcement element 25 is to strengthen the bushings 23 and 24 by providing additional bonded interface surface and longitudinal support between the bushings 23 and 24 to resist the forces applied by the hydraulic pressure. This permits the chamber 15' of the joint 22 to withstand a substantially higher fluid pressure than the chamber 15 of the joint 10 without rupture of the bushings 23 and 24 or failure of the bonded interfaces. Thus it is apparent that the joint 22, although somewhat higher in manufacturing cost than joint 10, is capable of use at higher fluid pressure. It should be observed that to obtain high strength, it is essential that, in the case of joint 10, the longitudinal conduit must extend to both bushings 13 and 14. Likewise in the case of joint 22 it is essential that both the conduit 18 and the reinforcement element 25 extend to both bushings 23 and 24.

Referring now to FIGURES 5, 6 and 7 there is shown a flexible fluid joint similar to that shown in FIGURES 1 and 2 except that the former is a double joint. This type of flexible fluid joint is particularly adapted for use in connection with double acting cylinders and hydrostatic transmissions wherein a high pressure fluid and a low or return fluid pressure joint is required for communicatively connecting a hydraulic pump with a cylinder or a hydraulic motor.

Referring to the drawing in FIGURE 5 the numeral 27 indicates generally a flexible fluid double joint of this invention. The joint 27 may include a generally cylindrically shaped hollow casing 28 constructed of rigid material such as steel. Secured in bonded relation to the inner peripheral wall 29 of the casing 28 are three resilient annular members or bushings 30, 31 and 32. The bushings 30, 31 and 32 are similar to the bushings 13 and 14 of FIGURE 1. From FIGURE 5 it will be seen that the bushings 30, 31 and 32 are positioned in axial spaced relation with respect to each other in the casing 28 forming chambers 33 and 34 as shown. As stated above in respect of bushings 13 and 14 it is also of primary importance that the bushings 30, 31 and 32 be constructed of flexible material such as, for example, natural or synthetic rubber, or a rubber-like elastomer or plastic.

Positioned in the casing 28 are transverse apertures 35, 36 fitted respectively with transverse rigid conduits 37, 38. The conduits 37, 38 are rigidly connected to the casing 28 by any conventional means such as by welding or brazing. From FIGURE 5 it will be apparent that the transverse conduit 37 is in fluid communication with chamber 33 and transverse conduit 38 is in fluid communication with chamber 34.

Positioned concentrically or axially with reference to the bushings 30, 31 and 32, as well as the casing 28, is a longitudinally disposed rigid conduit generally indicated at 39 in FIGURES 5, 6 and 7. The outer peripheral surface 40 of the longitudinal conduit 39 is secured in bonded relation to the bushings 30, 31 and 32. It will thus be apparent that the rubber-like resiliency of the bushings 30, 31 and 32 permits limited relative movement both axial and rotationally, of the longitudinal conduit 39 with reference to the casing 28.

Disposed within the longitudinal conduit 39 between the chambers 33 and 34 and adjacent to the bushing 31 is a plug 41 secured in sealed relation to the inner wall 42 of the conduit 39 by welding, brazing, pinning, or stroking. Thus the plug 41 prevents fluid communication between section 39a and section 39b of the longitudinal conduit 39 as best seen in FIGURE 5.

The longitudinal conduit 39 may be provided with a plurality of transverse openings 43 adjacent the chamber 33 thereby communicatively connecting section 39a of longitudinal conduit 39 with the chamber 33. Since it was previously stated that the transverse conduit 37 is communicatively connected to the chamber 33 it is apparent that in FIGURE 5 the section 39a of conduit 39 is in fluid communication with the conduit 37. Similarly the longitudinal conduit 39 may also be provided with a plurality of transverse openings 44 adjacent the chamber 34 thereby communicatively connecting section 39b of longitudinal conduit 39 with the chamber 34. From FIGURES 5 and 6 it will thus be apparent that section 39b of the longitudinal conduit 39 is in fluid communication with conduit 38. On the other hand it will be seen from FIGURE 5 that because of the interposition of the plug 41 no fluid communication exists between section 39a and section 39b of conduit 39 nor is there any fluid communication between conduit 37 and conduit 38.

From FIGURE 5 it will be apparent that the bushings 30, 31 and 32 need not be separate units but instead may be combined into a single sleeve-like unit having radial passages communicating transverse openings 43 with conduit 37 and transverse openings 44 with conduit 38.

From the foregoing it will be apparent that since the resilient or flexible bushing members 13, 14, 23, 24, 30, 31 and 32 are interposed between a conduit and a casing in bonded relation, the conduit may be moved to a limited degree with reference to the associated casing. In addition to the flexible fluid communication provided by the joint it will also be apparent that the conduit may carry a mechanical load with respect to its associated casing and yet carry fluid pressure.

Having thus described embodiments of the invention, it can now be seen that the objects of the invention have been fully achieved and it must be understood that changes and modifications may be made which do not depart from the spirit of the invention nor from the scope thereof as defined in the appended claims.

What is claimed is:

1. A flexible joint for conducting fluid under pressure comprising a tubular shaped rigid casing having at least one transverse aperture, a transverse conduit rigidly connected to said casing in communication with said aperture, a longitudinal conduit extending into said casing in endwise relation, at least one transverse opening disposed in said longitudinal conduit in registry with said transverse aperture, and resilient bushing means positioned between said longitudinal conduit and said casing, said resilient bushing means being secured sealingly to said casing and longitudinal conduit in bonded relation whereby said conduits are in fluid communication and said longitudinal conduit is resiliently movable with respect to said transverse conduit to a magnitude limited by said resilient bushing means.

2. A flexible joint for conducting fluid under pressure according to claim 1 wherein said resilient bushing means consists of flexible rubber resistant to said conducted fluid.

3. A flexible joint for conducting fluid under pressure comprising a tubular shaped rigid casing having at least one transverse aperture, a transverse conduit rigidly connected to said casing in communication with said aperture, a longitudinal conduit extending into said casing in end-wise relation, at least one transverse opening disposed in said longitudinal conduit in registry with said transverse aperture, resilient bushing means positioned in sealing relation between said longitudinal conduit and said casing, a tubular shaped reinforcement element positioned in said resilient bushing means, said tubular shaped reinforcement element having at least one port in registry with said transverse aperture and said transverse opening, said resilient bushing means being secured sealingly to said casing and longitudnial conduit in bonded relation whereby said conduits are in fluid communication through said port and said aperture and said opening, and said longitudinal conduit is resiliently movable with respect to said transverse conduit to a magnitude limited by said resilient bushing means.

4. A flexible joint for conducting fluid under pressure according to claim 3 wherein said resilient bushing means consists of flexible rubber resistant to said conducted fluid.

5. A flexible joint for conducting separately two fluids comprising a tubular shaped rigid casing having a pair of transverse apertures in longitudinal spaced relation, a transverse conduit connected to said casing in communication with each of said apertures, a longitudinal conduit extending through said casing in end-wise relation, a pair of transverse openings disposed in longitudinal spaced relation in said longitudinal conduit, each of said transverse openings being positioned in registry with each corresponding transverse aperture, resilient, bushnig means positioned between said longitudinal conduit and said casing, said resilient bushing means being secured sealingly to said casing and longitudinal conduit in bonded relation, and plug means disposed in said longitudinal conduit between said transverse openings whereby one of said transverse conduits is in fluid communication with one end portion of said longitudinal conduit and the other of said transverse conduits is in fluid communication with the other end portion of said longitudinal conduit, and said longitudinal conduit is resiliently movable with respect to said transverse conduits to a magnitude limited by said resilient bushing means.

6. A flexible joint for conducting separately two fluids according to claim 5 wherein said resilient bushing means consists of flexible rubber resistant to said conducting fluids.

References Cited by the Examiner

UNITED STATES PATENTS

| | | | |
|---|---|---|---|
| 1,499,851 | 7/1924 | Brown | 285—190 |
| 2,621,923 | 12/1952 | Krotz | 287—85 X |
| 2,752,925 | 7/1956 | Friers | 285—190 X |
| 2,795,398 | 6/1957 | Ragland | 287—85 X |
| 3,098,662 | 7/1963 | Iversen | 285—190 X |
| 3,140,081 | 7/1964 | Peterson | 287—85 X |
| 3,147,963 | 9/1964 | Frazier | 287—85 X |

FOREIGN PATENTS 810,904 8/1951 Germany.
91,343 2/1938 Sweden.

CARL W. TOMLIN, *Primary Examiner.*